UNITED STATES PATENT OFFICE.

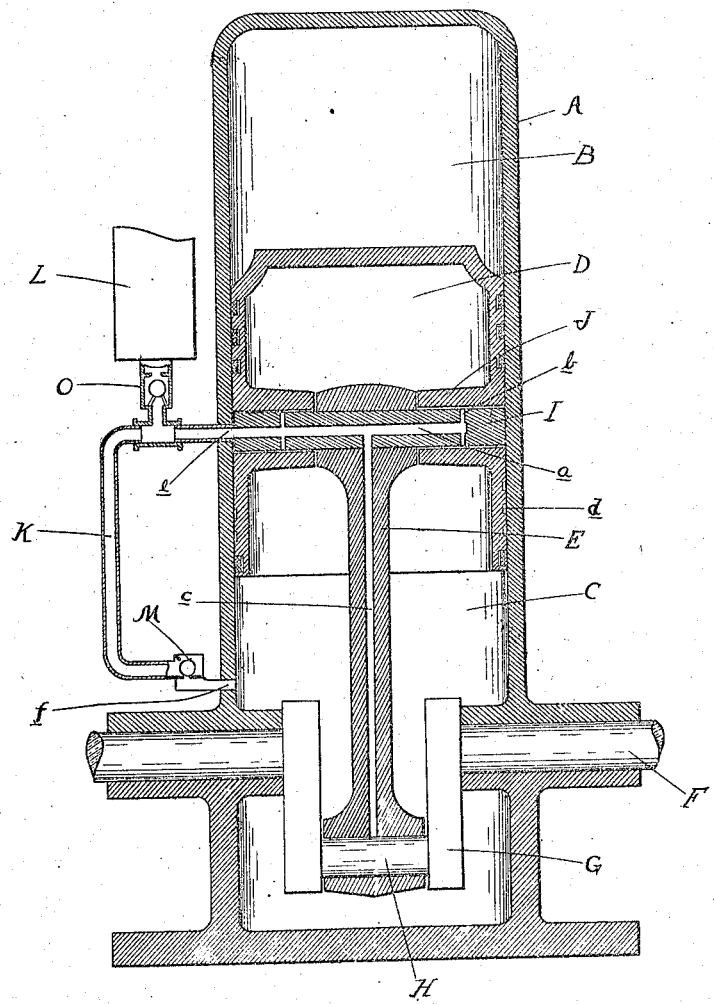

HARRY N. LINK, OF DETROIT, MICHIGAN, ASSIGNOR TO UNITED MANUFACTURING COMPANY, OF DETROIT, MICHIGAN, A CORPORATION OF MICHIGAN.

LUBRICATING SYSTEM.

No. 921,129.   Specification of Letters Patent.   Patented May 11, 1909.

Application filed February 1, 1908. Serial No. 413,877.

*To all whom it may concern:*

Be it known that I, HARRY N. LINK, a citizen of the United States of America, residing at Detroit, in the county of Wayne and State of Michigan, have invented certain new and useful Improvements in Lubricating Systems, of which the following is a specification, reference being had therein to the accompanying drawings.

The invention relates particularly to a lubricating system for explosion engines wherein pressure is employed to feed the oil to the parts to be lubricated, and it consists in the construction of lubricating means wherein the pressure is taken from the crank chamber, thus producing not only a positive but a uniform feed, and it further consists of a construction wherein the pressure is applied to the lubricant after it has left the reservoir or cup, thus permitting the oil to be first fed by gravity in the ordinary way, and subsequently positively driven independently of the cup to the several parts to be lubricated.

The invention still further consists in the novel means for lubricating the crank pin bearing, and in certain details of construction as will be more fully hereinafter set forth.

In the drawings,—the figure is a vertical central section through an explosion engine illustrating my invention.

The reference-letter A designates the usual engine cylinder divided interiorly into the usual explosion chamber B and crank chamber C.

D represents the piston, E the connecting rod, F the engine shaft, G its crank, and H the crank pin for the connecting rod.

I represents a crosshead pin mounted in suitable bearings, as J, in the piston to which the connecting rod E is connected. The crosshead pin, as shown, is formed with a longitudinal passage $a$ closed at one end, and with a plurality of transverse passages, as $b$. The connecting rod is also formed with a longitudinal passage $c$ leading from the passage $a$ to the crank pin bearing. The piston is provided with the usual oil grooves $d$, and the walls of the piston chamber and crank chamber are formed respectively with transverse passages $e$ and $f$.

K indicates the pressure conduit, preferably in the form of a tube connecting the passages $f$ and $e$ above described, and L is a sight feed lubricator of any approved type communicating with the pressure conduit at a point near the passage $e$. The conduit K is provided at or near the outlet opening $f$ with a suitable check-valve M, and the lubricator at a point above the pressure conduit with a check-valve O of any approved type.

In the operation of the engine, the lubricator is adjusted to feed oil into the upper part of the pressure conduit by gravity in any desired amounts. Upon the downstroke of the piston pressure is developed within the crank casing which passes through the pressure conduit and positively drives or blows such oil as is accumulated within its upper portion from the lubricator into the casing A through the passage $e$, thus lubricating the piston. The check-valve M is designed to permit pressure through the conduit upon the down stroke of the piston, while the check-valve O in the lubricator cuts off the latter from the pressure conduit, so that the cup or reservoir is not affected except that the feed is temporarily stopped. Upon the upstroke of the piston a vacuum is created in the crank casing, causing the check-valve M to close and the check O to open, and the lubricator feeds oil by gravity into the pressure conduit. When the parts are in position as shown in the drawing, with the passage $a$ of the crosshead pin alined with the pressure conduit K, the lubricant is driven within said passage, and also through the transverse passages $b$, thus lubricating the crosshead pin bearings. The lubricant is also driven through the longitudinal passage $c$ to the crank pin bearing, whereby the latter is constantly and effectively lubricated during the entire run of the engine.

From the construction set forth, it will be obvious that the lubricating is uniformly effected by reason of the pressure being taken from the crank casing, and further that by lubricating in the manner set forth there is no accumulation of oil in the crank casing, the distribution being such as to merely sufficiently oil the parts. Thus, the disadvantages following from the accumulation of the oil or from a deposit of oil in the crank casing as in the ordinary splash system are entirely obviated.

What I claim as my invention is,—

1. In a lubricating system for explosion engines, the combination with the engine cylinder and a crank chamber, of a pressure conduit connecting the two, and a lubricant supply connected to the conduit, the pressure in said conduit being independent of the lubricant supply.

2. In a lubricating system for explosion engines, the combination with the engine cylinder and crank chamber, of a pressure conduit connecting the chamber with the interior of the cylinder, a lubricator communicating with the conduit, and valves controlling said lubricator and pressure conduit whereby the pressure in said conduit is independent of the lubricator.

3. In a lubricating system for explosion engines, the combination with the crank casing, of the shaft crank and connecting rod therein, an oil supply, and means for forcing the oil to the crank pin bearing by the pressure developed in the crank case, the pressure in said means being independent of the oil supply.

4. In a lubricating system for explosion engines, the combination with a cylinder, the piston working therein, and a crank chamber, of a cross head having bearings in the piston, an oil supply, and means for forcing the oil to the cross head bearings by the pressure developed in the crank case, the pressure in said means being independent of the oil supply.

5. In an engine having a closed casing, the combination of an internal oil distributing pressure system and an external source of oil supply independent of the pressure periodically placed in communication with said internal system.

6. In an engine having a closed casing the combination of an external source of oil supply and an internal oil distributing pressure system periodically communicating with said external supply through registering ports in the cylinder and piston, the pressure in said internal system being independent of said oil supply.

7. In an engine having a closed casing, the combination of an external source of oil supply, and an internal oil distributing pressure system leading into a plurality of movable bearings, and periodically communicating with said external supply through registering ports in the cylinder and piston, the pressure in said internal system being independent of said oil supply.

8. In an engine the combination with a cylinder having a port therein, the piston, crank and connecting rod, of an oil conduit extending through said piston and connecting rod and distributing oil to the bearings, said conduit being periodically registered with a port in said cylinder, and an external source of oil supply communicating with said port through an intermediate pressure system.

9. In an engine, the combination with the cylinder, the piston, crank and connecting rod, said connecting rod having a channel therein, of a wrist pin for connecting said connecting rod with said piston and extending transversely through the latter, said wrist pin having an oil channel formed therein communicating with the oil channel in the connecting rod and distributing oil to the bearings at both the upper and lower end of said rod, and an external source of oil supply periodically communicating by means of an intermediate pressure system with said oil channels through a registering port in the cylinder.

10. In an explosion engine, the combination with a cylinder having a port therein, of a closed crank case, a conduit communicating with the air space within said crank case and leading directly to the port in said cylinder, an external oil supply connected with said conduit, and an internal oil distributing system periodically registered with said port in the cylinder and during the interval in which the air in said crank case is compressed whereby the lubricant is forced by the pressure in said conduit into said internal distributing system, the pressure in said conduit being independent of said external oil supply.

11. In an explosion engine, the combination with a cylinder having a port therein, of a closed crank case, an internal oil distributing system leading to the movable bearings within the engine and extending to the periphery of the piston, a conduit communicating with the air space within said crank case and leading to the port in said cylinder arranged to be in registration with the peripheral opening of said internal distributing system when the piston is at the limit of its downward stroke, an oil supply connecting with said conduit and independent of the pressure and check valves in said oil supply connection and said conduit, for the purpose described.

In testimony whereof I affix my signature in presence of two witnesses.

HARRY N. LINK.

Witnesses:
 NELLIE KINSELLA,
 JAMES P. BARRY.